US012379829B2

(12) United States Patent
Hu

(10) Patent No.: US 12,379,829 B2
(45) Date of Patent: Aug. 5, 2025

(54) INTERACTION METHOD AND APPARATUS FOR VIDEO CALL

(71) Applicant: VIVO MOBILE COMMUNICATION CO., LTD., Dongguan (CN)

(72) Inventor: Shuangshuang Hu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/138,076

(22) Filed: Apr. 22, 2023

(65) Prior Publication Data

US 2023/0259260 A1    Aug. 17, 2023

Related U.S. Application Data

(63) Continuation of application No. PCT/CN2021/124942, filed on Oct. 20, 2021.

(30) Foreign Application Priority Data

Oct. 27, 2020 (CN) .......................... 202011167360.2

(51) Int. Cl.
*G06F 3/04842* (2022.01)
*G06F 3/0481* (2022.01)
(Continued)

(52) U.S. Cl.
CPC ........ *G06F 3/04842* (2013.01); *G06F 3/0481* (2013.01); *G06F 3/04845* (2013.01); *G06F 3/0488* (2013.01)

(58) Field of Classification Search
None
See application file for complete search history.

(56) References Cited

U.S. PATENT DOCUMENTS 9,007,427 B2 * 4/2015 Hoover .................. H04N 7/157
  348/14.1
10,609,332 B1 * 3/2020 Turbell .................. H04N 7/152
(Continued)

FOREIGN PATENT DOCUMENTS

CN       105554429 A     5/2016
CN       105872438 A     8/2016
(Continued)

OTHER PUBLICATIONS

V. A. Nguyen et al., "ITEM: Immersive Telepresence for Entertainment and Meetings—A Practical Approach," in IEEE Journal of Selected Topics in Signal Processing, vol. 9, No. 3, pp. 546-561, Apr. 2015. (Year: 2015).*

(Continued)

*Primary Examiner* — Frank D Mills
(74) *Attorney, Agent, or Firm* — IPX PLLC

(57) ABSTRACT

An interaction method and apparatus for a video call are disclosed. The interaction method for a video call includes: receiving, during a video call between a first user and a second user, a first input by the second user for a first object corresponding to the first user in a video call interface; and displaying, in response to the first input, the first object in the video call interface according to a first preset display manner corresponding to the first input, where the first input includes a touch input for a target portion of the first object, and the first preset display manner includes deformation of the target portion corresponding to the touch input.

15 Claims, 12 Drawing Sheets

(51) Int. Cl.
    *G06F 3/04845*     (2022.01)
    *G06F 3/0488*     (2022.01)

(56) References Cited

U.S. PATENT DOCUMENTS

| | | | |
|---|---|---|---|
| 2011/0298827 A1* | 12/2011 | Perez | G06V 40/28 |
| | | | 345/647 |
| 2012/0050323 A1* | 3/2012 | Baron, Jr. | H04L 12/1818 |
| | | | 345/632 |
| 2012/0081501 A1 | 4/2012 | Benzaia et al. | |
| 2013/0141515 A1* | 6/2013 | Setton | H04N 7/147 |
| | | | 348/E7.083 |
| 2013/0222681 A1* | 8/2013 | Wan | H04N 23/56 |
| | | | 348/371 |
| 2014/0152758 A1* | 6/2014 | Tong | H04M 1/72439 |
| | | | 348/14.02 |
| 2014/0267546 A1* | 9/2014 | Kwon | H04N 7/147 |
| | | | 348/14.02 |
| 2014/0267583 A1* | 9/2014 | Zhu | H04N 19/21 |
| | | | 348/14.13 |
| 2015/0326827 A1* | 11/2015 | Chen | G06Q 10/101 |
| | | | 348/14.07 |
| 2015/0365627 A1* | 12/2015 | Deng | G06T 13/80 |
| | | | 348/14.07 |
| 2018/0160055 A1* | 6/2018 | Taine | G06V 40/174 |
| 2018/0300037 A1* | 10/2018 | Takeda | G06F 13/00 |
| 2020/0005538 A1* | 1/2020 | Neeter | H04L 65/4015 |
| 2020/0045245 A1 | 2/2020 | Van Os et al. | |
| 2020/0359893 A1* | 11/2020 | Rollins | G06F 3/04886 |

FOREIGN PATENT DOCUMENTS

| | | |
|---|---|---|
| CN | 106067960 A | 11/2016 |
| CN | 107071330 A | 8/2017 |
| CN | 107197194 A | 9/2017 |
| CN | 107529096 A | 12/2017 |
| CN | 108259810 A | 7/2018 |
| CN | 109862434 A | 6/2019 |
| CN | 109873971 A | 6/2019 |
| CN | 111010526 A | 4/2020 |
| CN | 112363658 A | 2/2021 |
| KR | 20090103211 A | 10/2009 |
| WO | 2012007034 A1 | 1/2012 |

OTHER PUBLICATIONS

International Search Report issued in corresponding International Application No. PCT/CN2021/124942, mailed Jan. 19, 2022, 8 pages.
First Office Action issued in corresponding CN Patent Application No. 202011167360.2, dated Sep. 28, 2021, 9 pages.
Second Office Action issued in corresponding CN Patent Application No. 202011167360.2, dated Apr. 6, 2022, 8 pages.
Extended European Search Report issued in related European Application No. 21885001.4, mailed Feb. 16, 2024, 8 pages.
Office Action issued in related Korean Application No. 10-2023-7008016, mailed Apr. 14, 2025, 14 pages.

* cited by examiner

INTERACTION METHOD AND APPARATUS FOR VIDEO CALL

CROSS-REFERENCE TO RELATED APPLICATIONS

This application is a continuation of International Application No. PCT/CN2021/124942, filed Oct. 20, 2021, which claims priority to Chinese Patent Application No. 202011167360.2, filed Oct. 27, 2020. The entire contents of each of the above-referenced applications are expressly incorporated herein by reference.

TECHNICAL FIELD

This application relates to the field of communication technologies, and specifically, to an interaction method and apparatus for a video call.

BACKGROUND

With vigorous development of the mobile Internet and continuous popularization of electronic devices, users have more demands on the mobile Internet. Nowadays, as a practical function of the electronic devices, video calls are favored by more and more people, and more and more users perform video calls through the electronic devices.

In the related art, when two users perform a video call through electronic devices, the users can watch real pictures of each other from screens, thereby realizing call experience of looking at each other and communicating. However, because video calls are performed through networks and screens, in the related art, some highly interesting interactive functions are lacking, and the interaction manner is relatively simple, which cannot provide diversified interactive experience for users during the video calls.

SUMMARY

Objectives of embodiments of this application are to provide an interaction method and apparatus for a video call.

According to a first aspect, an embodiment of this application provides an interaction method for a video call, applied to an electronic device having at least one display screen. The method includes:
  receiving, in a case that a first user performs a video call with a second user, a first input by the second user for a first object corresponding to the first user in a video call interface; and
  displaying, in response to the first input, the first object in the video call interface according to a first preset display manner corresponding to the first input, where the first input includes a touch input for a target portion of the first object, and the first preset display manner includes that the target portion corresponding to the touch input is deformed.

According to a second aspect, an embodiment of this application provides an interaction apparatus for a video call, applied to an electronic device having at least one display screen. The apparatus includes:
  a receiving module, configured to receive, in a case that a first user performs a video call with a second user, a first input by the second user for a first object corresponding to the first user in a video call interface; and
  a display module, configured to display, in response to the first input, the first object in the video call interface according to a first preset display manner corresponding to the first input, where the first input includes a touch input for a target portion of the first object, and the first preset display manner includes that the target portion corresponding to the touch input is deformed.

According to a third aspect, an embodiment of this application further provides an electronic device, including a processor, a memory, and a program or instruction stored in the memory and executable on the processor, the program or instruction, when executed by the processor, implementing the steps of the interaction method for a video call according to the first aspect.

According to a fourth aspect, an embodiment of this application provides a readable storage medium, storing a program or instruction, the program or instruction, when executed by the processor, implementing the steps of the interaction method for a video call according to the first aspect.

According to a fifth aspect, an embodiment of this application further provides a chip, including a processor and a communication interface, where the communication interface is coupled to the processor, and the processor is configured to run a program or instruction, to implement the interaction method for a video call according to the first aspect.

In the embodiments of this application, in a process in which a first user performs a video call with a second user, the second user may perform a first input for a first object that corresponds to the first user and that is displayed in a video call interface. When receiving the first input, an electronic device may display, in response to the first input, the first object according to a first preset display manner corresponding to the first input. For example, a user may perform a touch operation on a target portion of a video call object displayed in a video call interface. In response to the touch operation, the target portion of the video call object displayed in the interface may be correspondingly deformed. In this way, a diversified interaction manner can be provided for the user during a video call, and the user can change a display manner of the video call object in the video call interface through some operations implemented on the video call interface, thereby realizing an interesting interactive effect, and effectively improving video call experience of the user.

DETAILED DESCRIPTION

Figure 1:
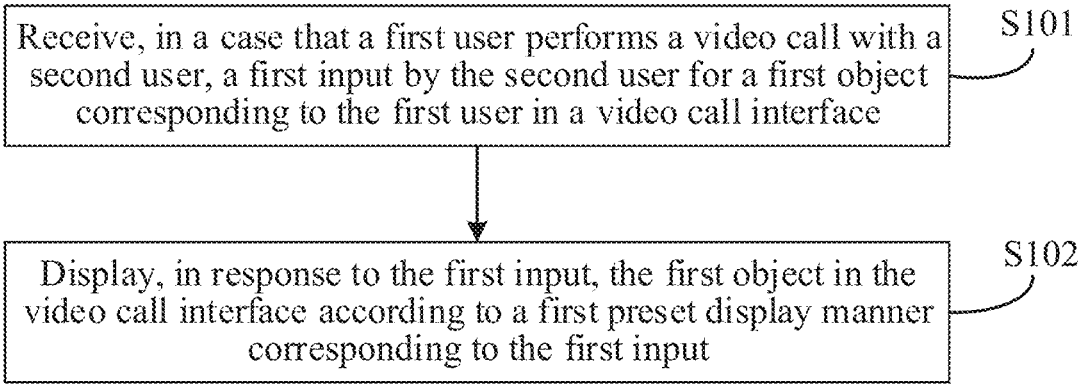
FIG. 1 is a schematic flowchart of an embodiment of an interaction method for a video call according to this application.

The following describes in detail the features of the various aspects and examples of embodiments of the present application. To make the objectives, technical solutions, and advantages of the present application clearer and more understandable, the present application is further described in detail below with reference to the accompanying drawings and specific embodiments. It should be understood that the specific embodiments described herein are merely used to explain the present application but are not intended to limit the present application. A person skilled in the art may implement the present application without some of the specific details. The following embodiments are described only to provide a better understanding of the present application by showing an example of the present application.

Terms in the specification and claims of this application, such as "first" and "second", are used to distinguish similar objects, but are unnecessarily used to describe a specific sequence or order. It should be understood that the data in such a way are interchangeable in proper circumstances, so that the embodiments of this application can be implemented in an order other than the orders illustrated or described herein. Objects distinguished by "first", "second", and the like are usually one type, and a number of objects is not limited. For example, the first object may have one or more than one. In addition, in the specification and the claims, "and/or" means at least one of the connected objects, and the character "/" generally indicates an "or" relationship between the associated objects.

Like the background art, in the related art, when two users perform a video call through electronic devices, the users can watch real pictures of each other from screens, thereby realizing call experience of looking at each other and communicating.

However, because video calls are performed through networks and screens, in the related art, some highly interesting interactive functions are lacking, and the interaction manner is relatively simple, which cannot provide diversified interactive experience for users during the video calls.

For the problem in the related art, an embodiment of this application provides an interaction method for a video call. In a process in which a first user performs a video call with a second user, the second user may perform a first input for a first object that corresponds to the first user and that is displayed in a video call interface. When receiving the first input, an electronic device may display, in response to the first input, the first object according to a first preset display manner corresponding to the first input. For example, a user may perform a touch operation on a target portion of a video call object displayed in a video call interface. In response to the touch operation, the target portion of the video call object displayed in the interface may be correspondingly deformed. In this way, a diversified interaction manner can be provided for the user during a video call, and the user can change a display manner of the video call object in the video call interface through some operations implemented on the video call interface, thereby realizing an interesting interactive effect, and effectively improving video call experience of the user. In this way, the problem that the interaction manner during a video call in the related art is relatively simple is resolved.

By using an example in which an execution subject of the interaction method for a video call is an electronic device having at least one display screen, the interaction method for a video call provided in this embodiment of this application is described in detail below through specific embodiments with reference to the accompanying drawings. It should be noted that, the foregoing execution subject does not constitute a limitation to this application.

It should be noted that, the electronic device in this embodiment of this application may include at least one of the following devices capable of receiving information and displaying information, such as a mobile phone, a tablet computer, and a smart wearable device.

FIG. 1 is a schematic flowchart of an embodiment of an interaction method for a video call according to this application. As shown in FIG. 1, the interaction method for a video call may include S101 and S102.

S101. Receive, in a case that a first user performs a video call with a second user, a first input by the second user for a first object corresponding to the first user in a video call interface.

In a process in which the second user performs the video call with the first user through an electronic device, the first object corresponding to the first user and a second object corresponding to the second user may be displayed in the video call interface.

Figure 2:
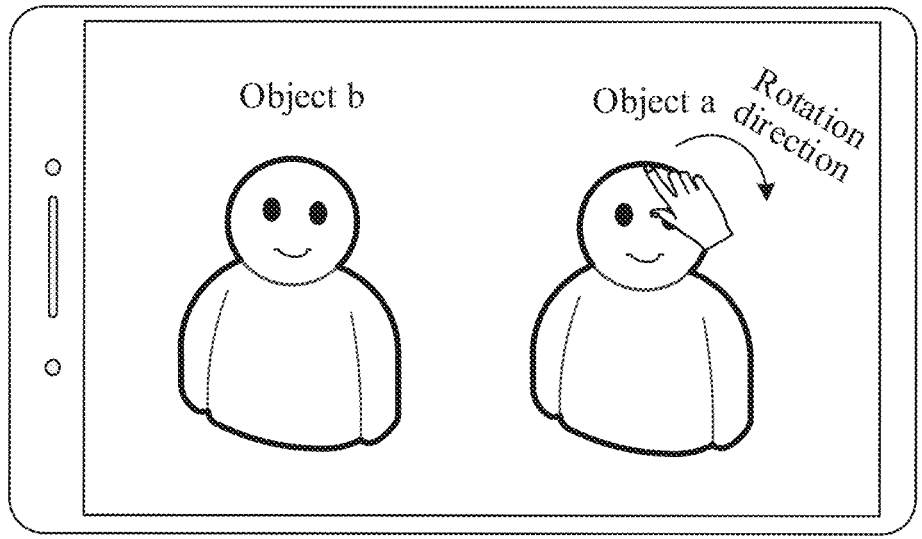
FIG. 2 is a first schematic diagram of an interaction interface for a video call according to an embodiment of this application.
Figure 2:
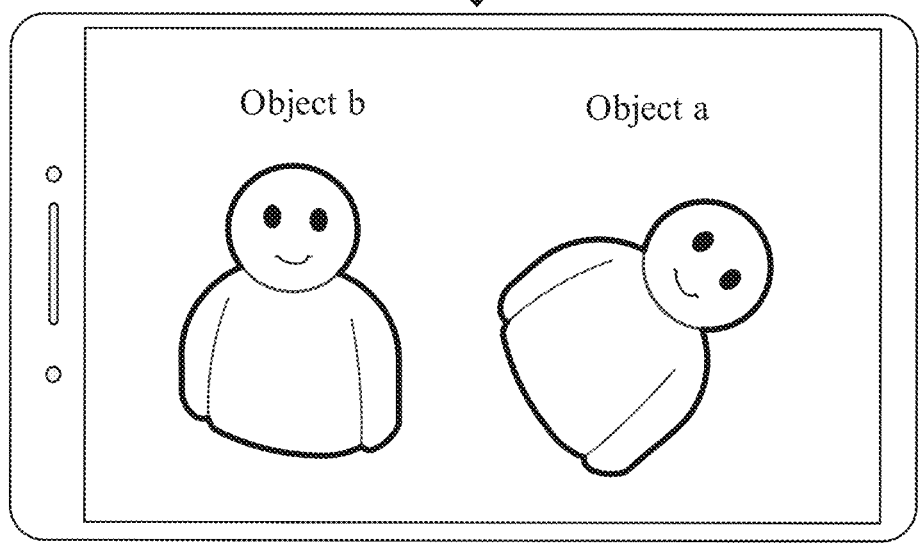

In an example, the first user is a user A, and the second user is a user B. FIG. 2 is a schematic diagram of an example of an interaction interface for a video call according to this application. As shown in FIG. 2, objects a and b are displayed in a video call interface of the users A and B. The object a is the first object corresponding to the user A, and the object b is the second object corresponding to the user B.

The electronic device receives the first input by the second user for the first object corresponding to the first user in the video call interface, where the first input may include a touch input for a target portion of the first object.

Herein, the target portion may be a body portion selected by the second user from a plurality of body portions of the first object, for example, a face, a shoulder, a hand, or the like of the first object. The touch input may be a click input, a double-click input, a pull input, a sliding input, a combination of two or more inputs, or the like of the second user for the target portion.

Figure 3:
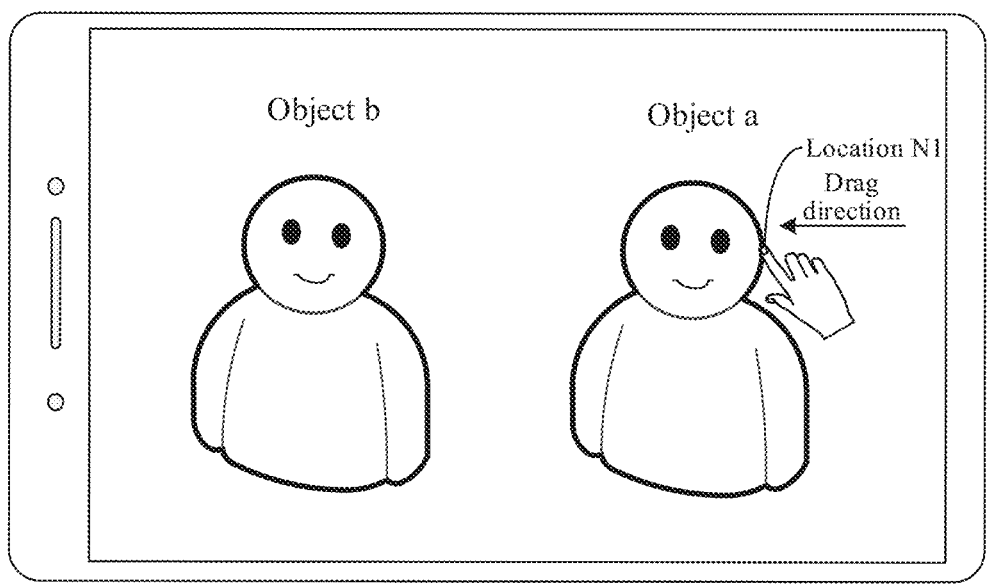
FIG. 3 is a second schematic diagram of an interaction interface for a video call according to an embodiment of this application.

For example, as shown in FIG. 3, the first object corresponding to the first user is an object a, and the first input may be a pull input by the second user for a face location N1 (that is, the target portion) of the object a.

In an embodiment, the receiving, in a case that a first user performs a video call with a second user, a first input by the second user for a first object corresponding to the first user in a video call interface may include: receiving, in a case that the first user performs the video call with the second user, the touch input by the second user for the target portion of the first object corresponding to the first user in the video call interface.

In an embodiment, in a case that the foregoing electronic device having at least one display screen is a smart wearable device, the second object corresponding to the second user may be a panoramic portrait of the second user.

S102. Display, in response to the first input, the first object in the video call interface according to a first preset display manner corresponding to the first input.

In a case that the first input is the touch input for the target portion of the first object, the first preset display manner corresponding to the first input may include that: the target portion corresponding to the touch input is deformed.

In an embodiment, the displaying, in response to the first input, the first object in the video call interface according to a first preset display manner corresponding to the first input may include: displaying the first object whose target portion is deformed in the video call interface.

For example, the first object corresponding to the first user is an object a, the electronic device receives a pull input by the second user for a face location N1 of the object a, and a face of the object a is the target portion. In response to the pull input, the face of the object a may be correspondingly deformed.

In this way, an electronic device receives a touch input by a user for a target portion of a video call object, and may display, in response to the touch input, the video call object whose target portion is deformed in a video call interface, to realize an interesting interaction with the video call object, thereby enriching an interaction manner during a video call.

In an embodiment, the first input may include a pull input, a click input, a double-click input, a sliding input, a rotation input, a combination of two or more inputs, or the like by the second user for the first object, and display manners corresponding to different first inputs may be set according to specific requirements.

For example, if the first input is that the second user rotates the first object, as shown in FIG. 2, the first preset display manner corresponding to the first input is that the first object rotates.

For another example, if the first input is that the second user double-clicks the first object, the first preset display manner corresponding to the first input may include: displaying the first object that jumps.

For another example, if the first input is that the second user long presses the first object by using two fingers and the two fingers move in opposite directions simultaneously, the first preset display manner corresponding to the first input may include that: the first object is enlarged or reduced.

It should be noted that, to enable the first user to synchronously watch an interactive effect of the video call interface and strengthen communication between two parties of the video call, when the first object is displayed in the video call interface according to the first preset display manner corresponding to the first input, the first object may also be displayed in a video call interface of an electronic device corresponding to the first user according to the first preset display manner, to realize video call experience in which the two parties of the video call synchronously watch the interactive effect.

In the interaction method for a video call provided in this embodiment of this application, in a process in which a first user performs a video call with a second user, the second user may perform a first input for a first object that corresponds to the first user and that is displayed in a video call interface. When receiving the first input, an electronic device may display, in response to the first input, the first object according to a first preset display manner corresponding to the first input. For example, a user may perform a touch operation on a target portion of a video call object displayed in a video call interface. In response to the touch operation, the target portion of the video call object displayed in the interface may be correspondingly deformed. In this way, a diversified interaction manner can be provided for the user during a video call, and the user can change a display manner of the video call object in the video call interface through some operations implemented on the video call interface, thereby realizing an interesting interactive effect, and effectively improving video call experience of the user. S101 and S102 are described below in detail with reference to specific embodiments.

In an embodiment, to ensure safety of an interaction behavior during the video call, in S102, the displaying, in response to the first input, the first object in the video call interface according to a first preset display manner corresponding to the first input may include: determining a behavioral feature of the first input; and displaying, in a case that the behavioral feature of the first input is consistent with a preset behavioral feature, the first object in the video call interface according to the first preset display manner corresponding to the first input.

The preset behavioral feature may be a behavioral feature corresponding to a safe behavior. When receiving the first input, the electronic device may save an image corresponding to a current video call interface, detect and recognize the image to determine the behavioral feature corresponding to the first input, and match the behavioral feature corresponding to the first input with the preset behavioral feature. When the behavioral feature corresponding to the first input is consistent with the preset behavioral feature, the first input is determined as a safe behavior, and in this case, the first object is displayed according to the first preset display manner corresponding to the first input.

In an embodiment, the safe behavior may include a touch input for a non-private portion, for example, a touch input for a hand, a head, a shoulder, an arm, or the like.

For example, the first input is a touch input by the second user for a shoulder of the first object. The electronic device receives the first input, and determines that the behavioral feature of the first input is "touching the shoulder", which is consistent with the behavioral feature corresponding to the safe behavior. Therefore, the first object whose shoulder is patted on is displayed in the video call interface.

In another embodiment, in a case that the behavioral feature of the first input is inconsistent with the preset behavioral feature, the method may further include: displaying prompt information, where the prompt information is used for prompting the second user to stop an unsafe behavior.

For example, the first input is a touch input by the second user for a chest of the first object. The electronic device receives the first input, and determines the behavioral feature of the first input is "touching the chest", which belongs to an indecent behavior and is inconsistent with the behavioral feature corresponding to the safe behavior. Therefore, prompt information of "Please stop the unsafe behavior" may be displayed in the video call interface, to warn the second user.

In this way, the behavioral feature of the first input is determined, and only a safe behavior corresponding to a behavioral feature consistent with the preset behavioral feature is displayed in the video call interface, thereby effectively filtering out a behavior corresponding to a behavioral feature inconsistent with the preset behavioral feature, for example, an indecent behavior. In this way, the safety of the interaction behavior during the video call can be ensured, thereby improving safety of the video call.

In an embodiment, an interaction control may be displayed in the video call interface, and the first input may include a click input for the interaction control.

Herein, the interaction control may be a control for implementing interaction with the first object, for example, an emotion control or an action control. The interaction control corresponds to the first preset display manner.

In the foregoing embodiment, in a case that the first input is the click input for the interaction control, the first preset display manner may include a preset interactive animation, and in S102, the displaying, in response to the first input, the first object in the video call interface according to a first preset display manner corresponding to the first input may include: displaying, in response to the first input, the preset interactive animation with the first object in the video call interface.

The preset interactive animation may be an animation of performing an interaction action on the first object, for example, an animation of holding hands with the first object, an animation of flicking a head of the first object, an animation of patting on the shoulder of the first object, or an animation of rubbing the face of the first object.

Figure 4:
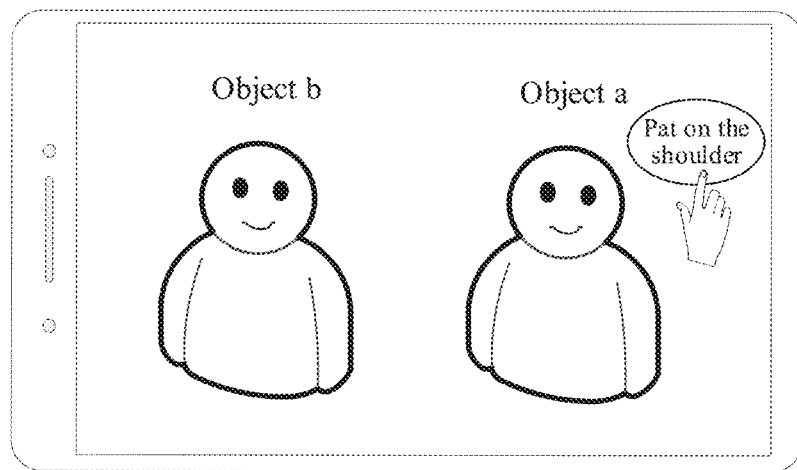
FIG. 4 is a third schematic diagram of an interaction interface for a video call according to an embodiment of this application.
Figure 4:
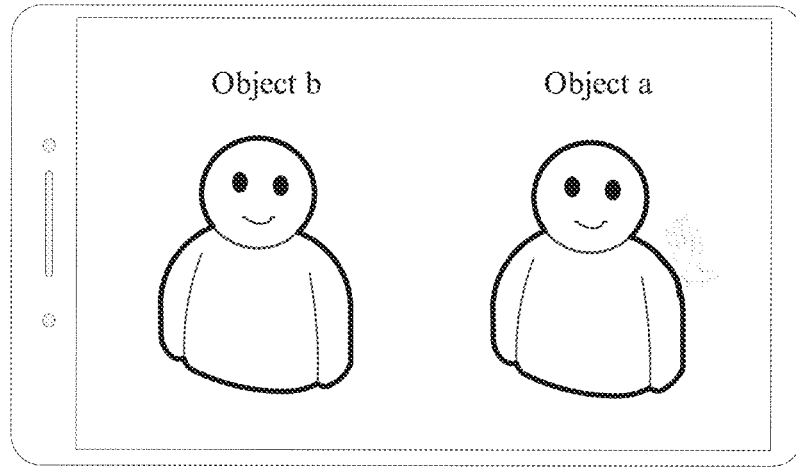

In an example, the first user corresponds to an object a. As shown in FIG. 4, an interaction control of "patting on the shoulder" is displayed in the video call interface. The electronic device receives a click input by the second user for the interaction control, and displays, in response to the click input, an animation of using a hand to pat on a shoulder of the object a in the video call interface.

In this way, a user can implement interaction with a video call object through an operation of clicking an interaction control, which realizes intimate communication between two parties of a video call while simplifying the operation difficulty of the user, and further enriches the interaction manner during the video call.

In an embodiment, to improve interaction experience for a user during a video call, the first input may further include a second input of moving the first object to a target region in the video call interface.

In the foregoing embodiment, in S101, the receiving, in a case that a first user performs a video call with a second user, a first input by the second user for a first object corresponding to the first user in a video call interface may include: receiving, in a case that the first user performs the video call with the second user, the second input of moving the first object in the video call interface to the target region in the video call interface by the second user. In S102, the displaying, in response to the first input, the first object in the video call interface according to a first preset display manner corresponding to the first input may include: displaying the first object in the target region in the video call interface.

The target region may be any region selected by the second user in the video call interface. The second input may be a drag input of moving the first object to the target region by the second user.

Figure 5:
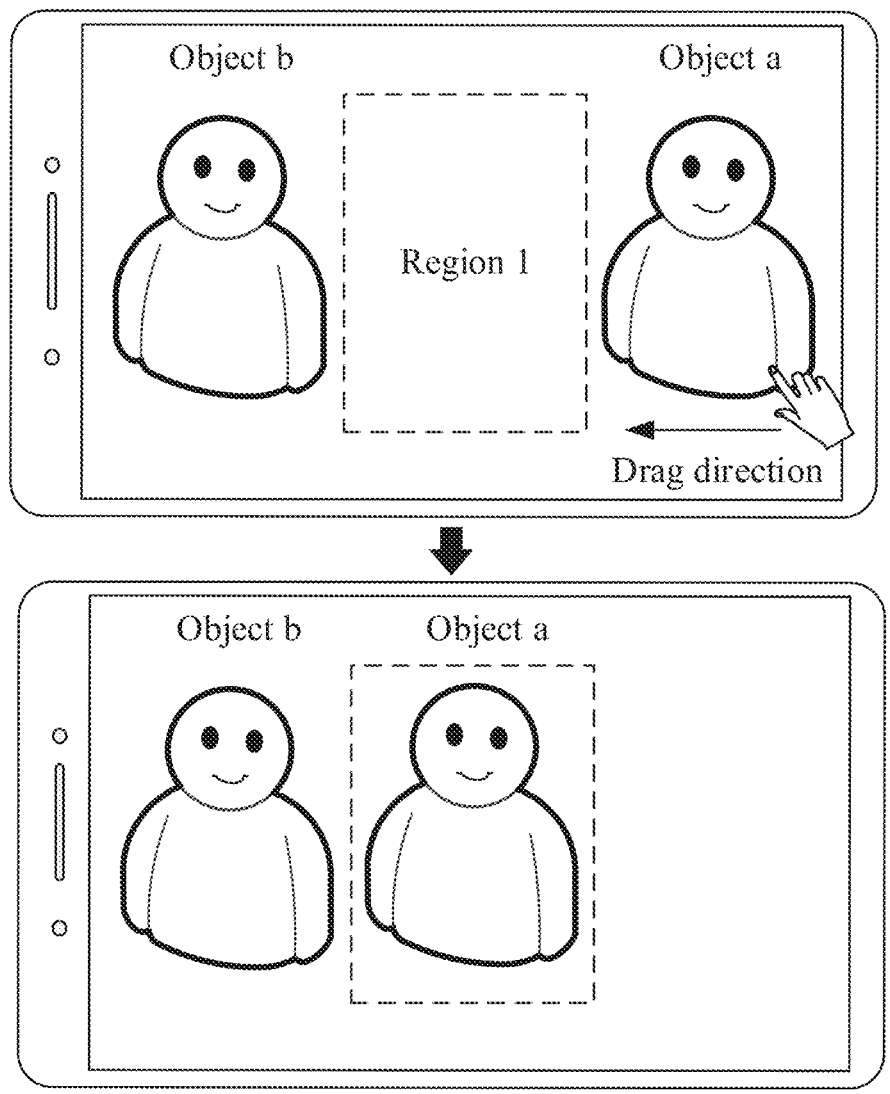
FIG. 5 is a fourth schematic diagram of an interaction interface for a video call according to an embodiment of this application.

In an example, as shown in FIG. 5, the target region is a region 1, and the first object is an object a. The electronic device receives a drag input of moving the object a to the region 1 by the second user, and displays, in response to the drag input, the object a in the region 1.

In an embodiment, in a case that the target region includes the second object corresponding to the second user, the displaying the first object in the target region may include: displaying the first object and the second object in the target region.

Figure 6:
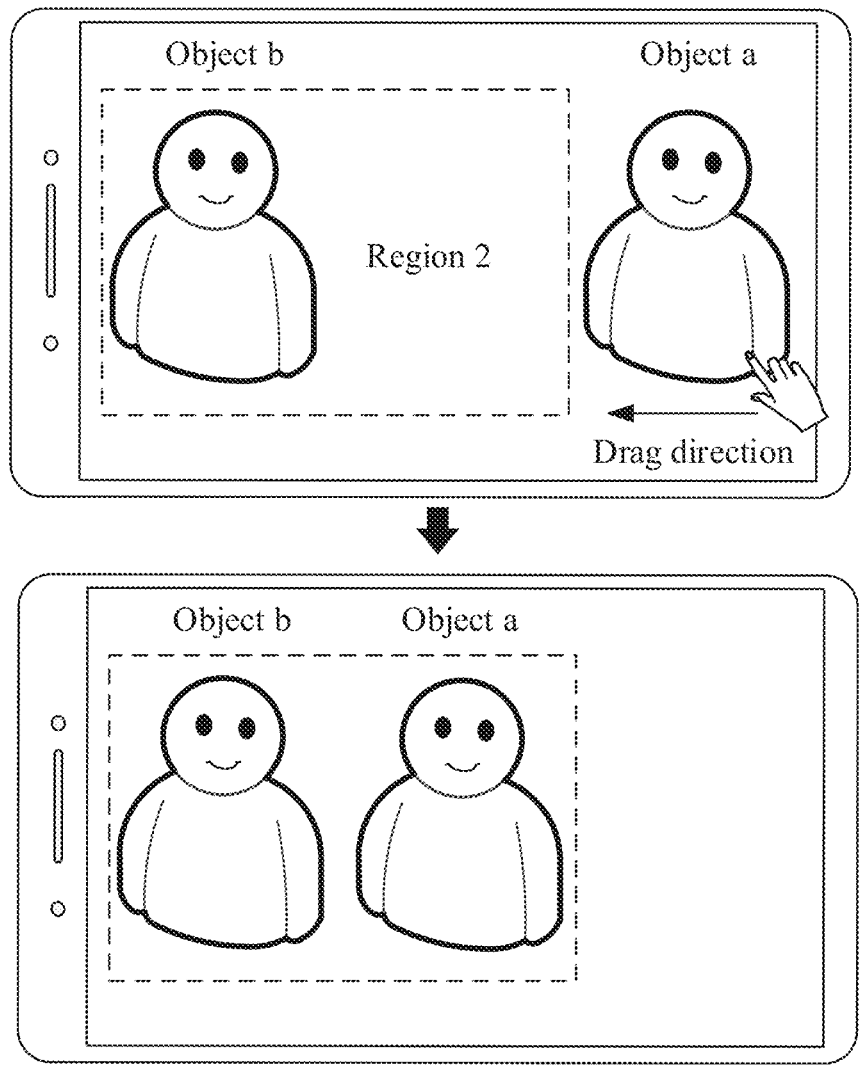
FIG. 6 is a fifth schematic diagram of an interaction interface for a video call according to an embodiment of this application.

In an example, as shown in FIG. 6, the target region is a region 2, the first object is an object a, the second object is an object b, and the object b is displayed in the region 2. The electronic device receives a drag input of moving the object a to the region 2 by the second user, and displays, in response to the drag input, the object a and the object b in the region 2.

In this way, a user can perform a moving operation on a video call object in a video call interface and move the video call object to any region in the video call interface, and can also move the video call object to a region in which the user is located, thereby shortening a distance between two parties of a video call, and bringing new video call experience for the user.

In some embodiments of this application, to avoid some misoperations caused by a user accidentally touching a video playback interface, a first control or a preset region may be displayed in the video call interface.

Figure 7:
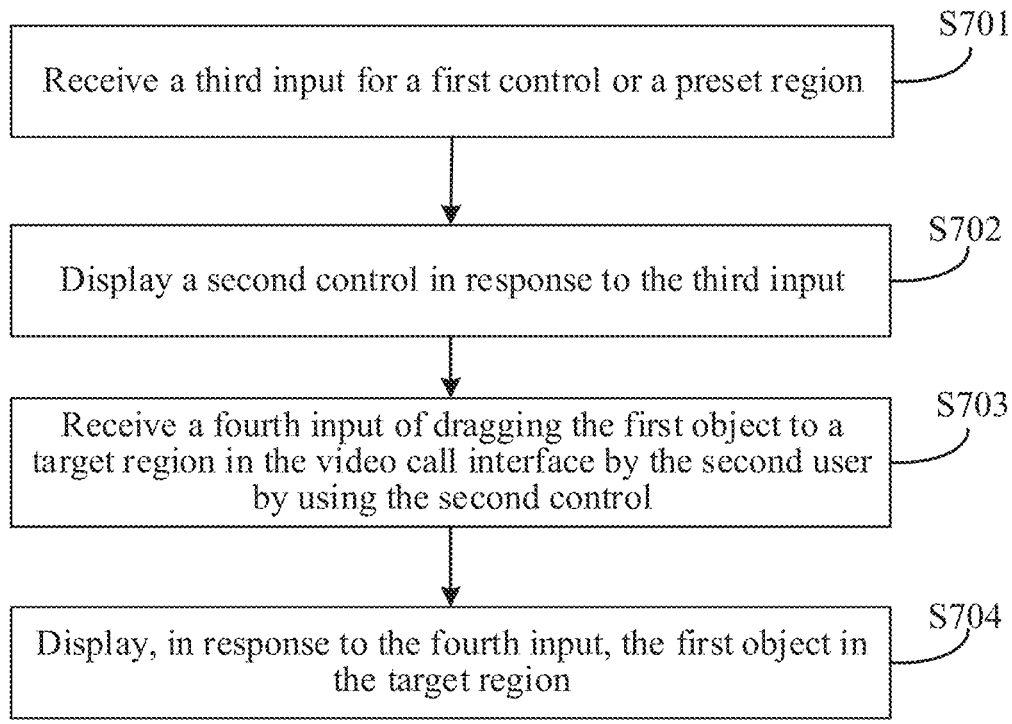
FIG. 7 is a schematic flowchart of another embodiment of an interaction method for a video call according to this application.

FIG. 7 is a schematic flowchart of another embodiment of an interaction method for a video call according to this application. An execution subject of the interaction method for a video call may be an electronic device having at least one display screen. As shown in FIG. 7, the interaction method for a video call provided in this embodiment of this application may include S701 to S704.

S701. Receive a third input for a first control or a preset region.

The preset region may be set according to a specific requirement, and may be any region in a video call interface. The first control and the preset region may be used for enabling a "movement mode" of the video call interface. In the "movement mode", a second user may move a first object.

The third input may be a click input, a sliding input, a double-click input, or the like by the second user for the first control or the preset region.

Figure 8:
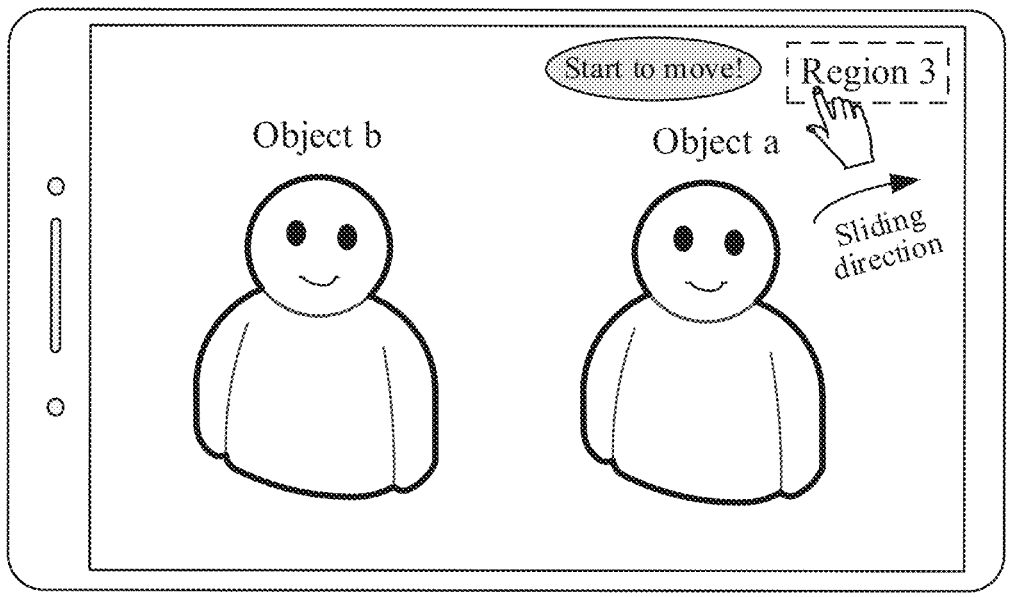
FIG. 8 is a sixth schematic diagram of an interaction interface for a video call according to an embodiment of this application.

For example, as shown in FIG. 8, the first object is an object a, the first control is a "start to move!" control, the preset region is a region 3, and the third input is a sliding input by the second user for the region 3. The electronic device receives the sliding input, and enables a "movement mode" of the video call interface. In the "movement mode", the second user may freely move the object a.

S702. Display a second control in response to the third input.

Figure 9:
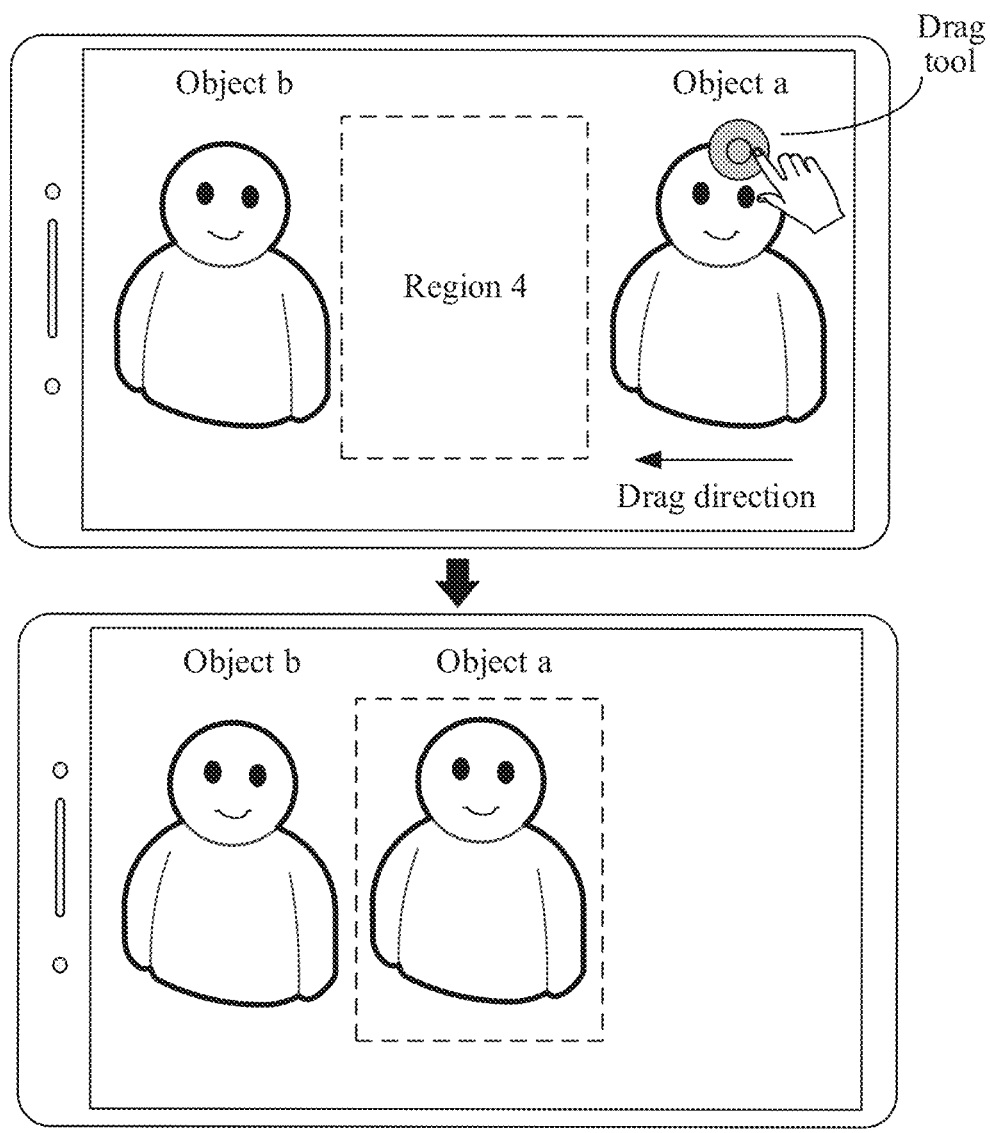
FIG. 9 is a seventh schematic diagram of an interaction interface for a video call according to an embodiment of this application.

The second control may be a tool for moving the first object, for example, a "drag tool" shown in FIG. 9.

S703. Receive a fourth input of dragging the first object to a target region in the video call interface by the second user by using the second control.

The target region may be any region selected by the second user in the video call interface. The fourth input may be a drag input, a sliding input, a pull input, or the like by the second user for the second control.

In an example, the second user may move the second control to any body portion of the first object, and then drag the second control to drag the first object to the target region.

For example, as shown in FIG. 9, the first object is an object a, the second control is a "drag tool", and the target region is a region 4. The second user moves the "drag tool" to a head location of the object a, and then drags the object a to the region 4 through a drag input for the "drag tool".

S704. Display, in response to the fourth input, the first object in the target region.

As shown in FIG. 9, in response to the drag input of dragging the object a to the region 4 by the second user through the "drag tool", the object a is displayed in the region 4.

In this way, an electronic device can move a video call object only when the electronic device receives an input by a user for a first control or a preset region, to avoid some misoperations caused by the user accidentally touching a video playback interface, for example, avoid the user accidentally moving a first object to a corner region of the video playback interface, thereby improving use experience of the user.

In some embodiments of this application, a user can change a display manner of a video call object in a video call interface, and can also change a display manner of an object corresponding to the user. The interaction method for a video call provided in this embodiment of this application may further include: receiving a seventh input by a second user for the second object corresponding to the second user in the video call interface; and displaying, in response to the seventh input, the second object in the video call interface according to a second preset display manner corresponding to the seventh input.

The electronic device receives the seventh input by the second user for the second object corresponding to the second user in the video call interface, where the seventh input may be a pull input, a click input, a double-click input, a sliding input, a combination of two or more inputs, or the like of the second user for the second object.

In an example, display manners corresponding to different seventh inputs may be set according to specific requirements.

For example, if the seventh input is that the second user double-clicks the second object, the second preset display manner corresponding to the seventh input may include: displaying the second object that jumps.

For another example, if the seventh input is that the second user long presses the second object by using two fingers and the two fingers move in opposite directions simultaneously, the second preset display manner corresponding to the seventh input may include that: the second object is enlarged or reduced.

It should be noted that, to enable the first user to synchronously watch an interactive effect of the video call interface and strengthen communication between two parties of the video call, when the second object is displayed in the video call interface according to the second preset display manner corresponding to the seventh input, the second object may also be displayed in a video call interface of an electronic device corresponding to the first user according to the second preset display manner, to realize video call experience in which the two parties of the video call synchronously watch the interactive effect.

In this way, a user can change a display manner of a video call object in a video call interface, and can also change a display manner of an object corresponding to the user, thereby further enriching the interactive function during a video call, and providing comprehensive video call interactive experience for the user.

In some embodiments of this application, to improve user experience, a user can freely replace a video call background, and a third control and the second object corresponding to the second user may be displayed in the video call interface.

Figure 10:
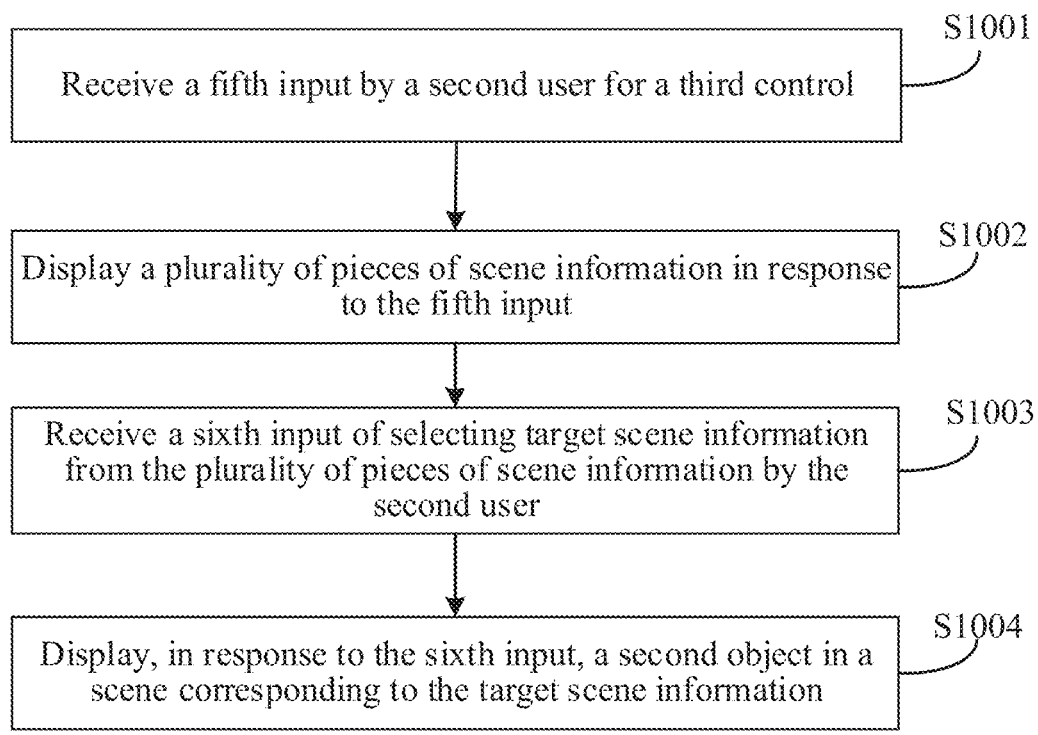
FIG. 10 is a schematic flowchart of still another embodiment of an interaction method for a video call according to this application.

FIG. 10 is a schematic flowchart of still another embodiment of an interaction method for a video call according to this application. An execution subject of the interaction method for a video call may be an electronic device having at least one display screen. As shown in FIG. 10, the interaction method for a video call provided in this embodiment of this application may include S1001 to S1004.

S1001. Receive a fifth input by a second user for a third control.

The third control may be a tool for replacing a video call background, and the fifth input may be a click input, a double-click input, a sliding input, or the like by the second user for the third control.

Figure 11:
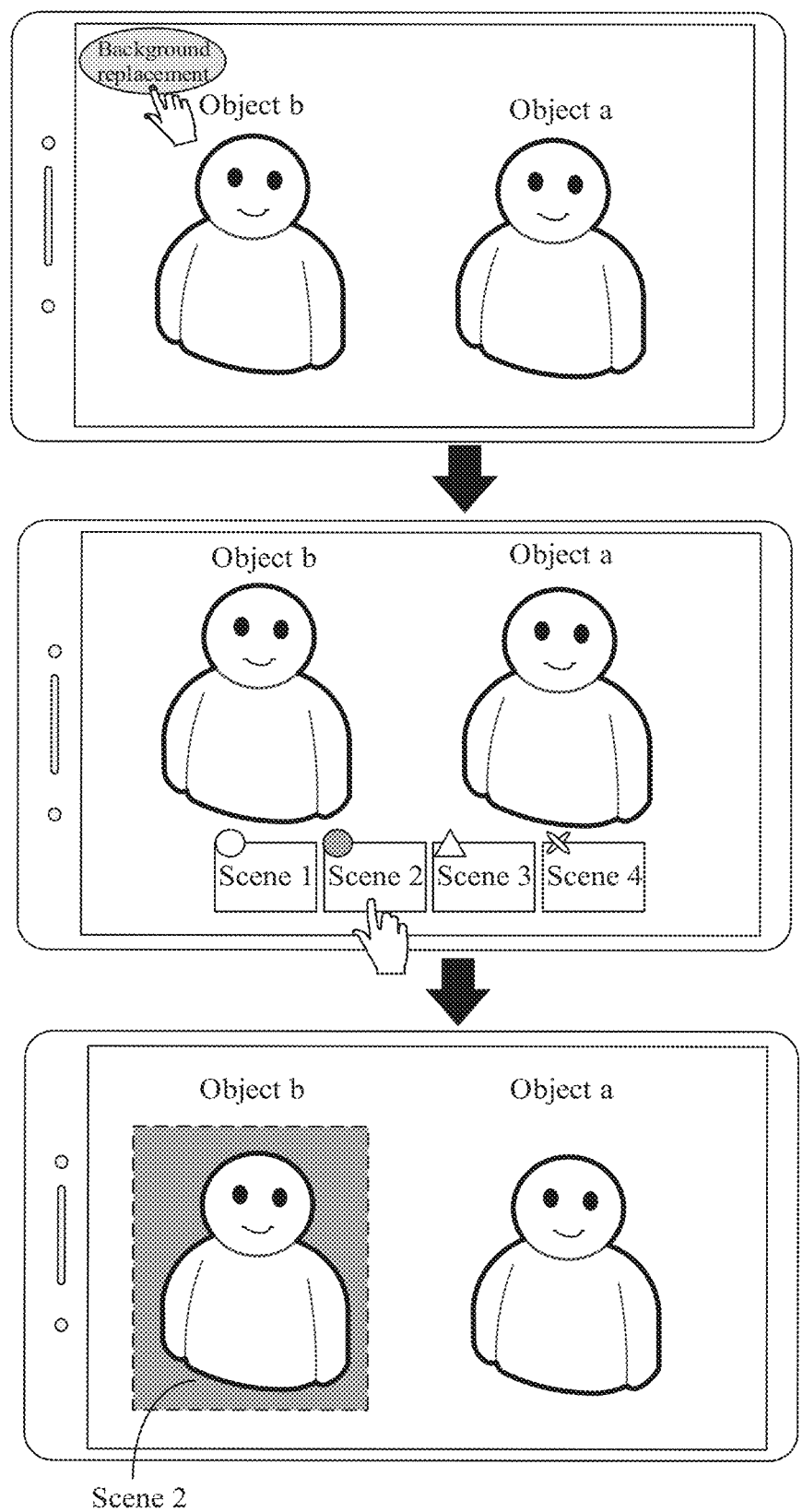
FIG. 11 is an eighth schematic diagram of an interaction interface for a video call according to an embodiment of this application.

For example, as shown in FIG. 11, the third control is a "background replacement" control, and the fifth input is a double-click input by the second user for the "background replacement" control.

S1002. Display a plurality of pieces of scene information in response to the fifth input.

The scene information includes at least one of a current video call background of a first user, a current video call background of the second user, or preset virtual scene information. The preset virtual scene information may be set according to a specific requirement.

In an embodiment, an electronic device may directly obtain the current video call background of the second user through a depth of field effect and 360° panoramic imaging of a camera, and the current video call background may realistically represent a real environment where the second user is located. In addition, the electronic device may directly obtain the current video call background of the first user displayed in a video call interface.

In an embodiment, the preset virtual scene information may include game scene information, scenery scene information, and the like, and may also include image information locally stored by the electronic device, for example, information about a picture in a gallery.

S1003. Receive a sixth input of selecting target scene information from the plurality of pieces of scene information by the second user.

The sixth input may be a click input, a double-click input, a sliding input, or the like by the second user for the target scene information from the plurality of pieces of scene information displayed in the interface.

For example, as shown in FIG. 11, in response to the double-click input by the second user for the "background replacement" control, a scene 1 to a scene 4 are displayed in the video call interface, and the sixth input is a click input by the second user for the scene 2.

S1004. Display, in response to the sixth input, a second object in a scene corresponding to the target scene information.

As shown in FIG. 11, the second object is an object b. In response to the click input by the second user for the scene 2, the electronic device replaces a video call background of the object b with the scene 2, and displays the object b in the scene 2.

In this way, after receiving an input of selecting target scene information from a plurality of pieces of scene information by a user, in response to the input, an electronic device can replace a video call background of the user with the target scene information, thereby providing a function of independently replacing the video call background for the user during a video call, and effectively improving user experience.

In an embodiment, to realize an interactive effect that two parties of a video call can appear in a same scene, the displaying a second object in a scene corresponding to the target scene information may include: displaying a first object and the second object in the scene corresponding to the target scene information.

Figure 12:
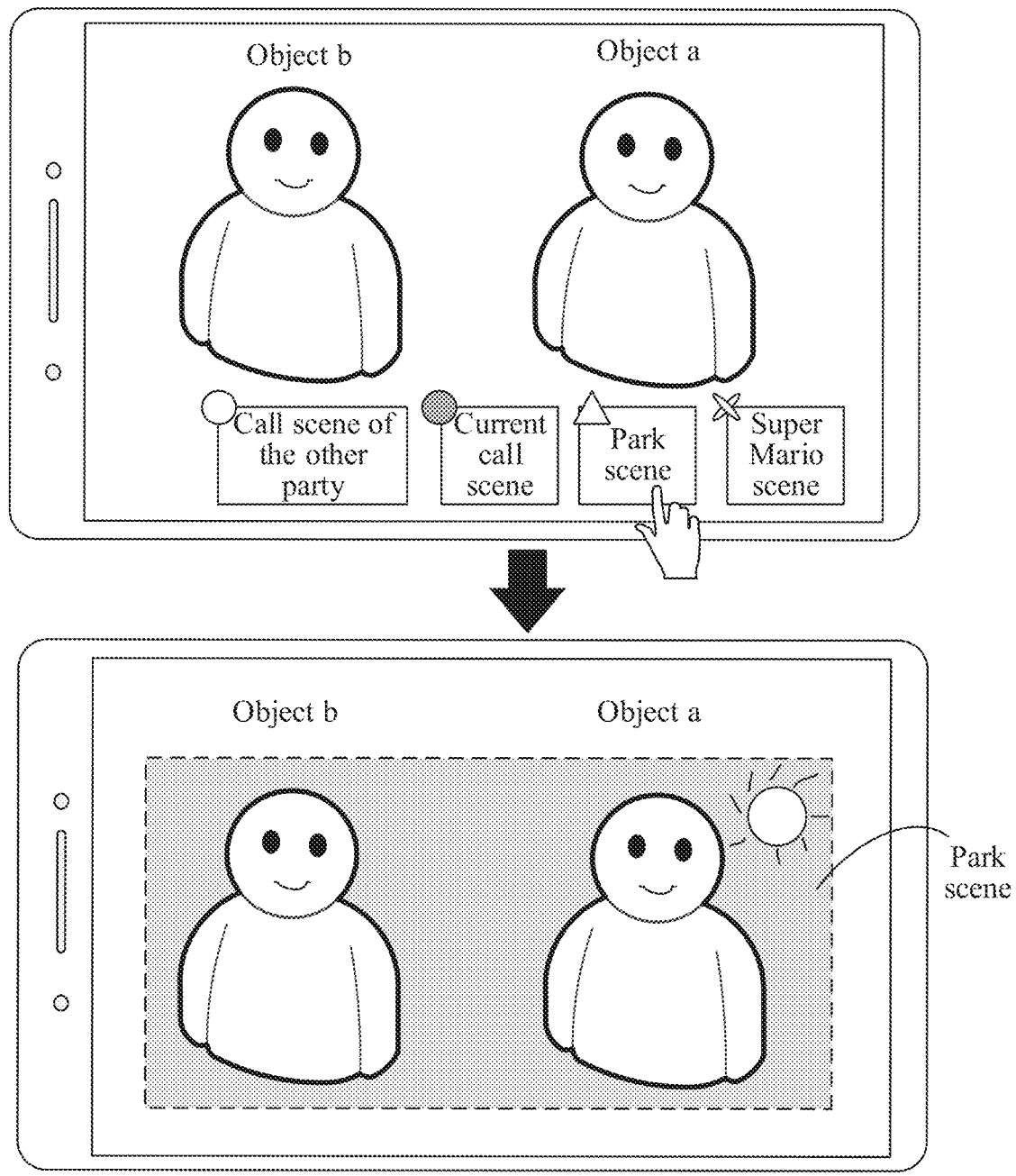
FIG. 12 is a ninth schematic diagram of an interaction interface for a video call according to an embodiment of this application.

In an example, as shown in FIG. 12, the first object is an object a, the second object is an object b, and a current call background of the object a: a "call scene of the other party" and a current call background of the object b: a "current call scene", a "park scene", and a "super Mario scene" are displayed in a video playback interface. The electronic device receives a click input by the second user for the "park scene", replaces the video call backgrounds of the object a and the object b with the "park scene", and simultaneously displays the objects a and b in the "park scene".

In this way, a user can select a scene corresponding to target scene information as a public scene of two parties of a video call, and the two parties of the video call can simultaneously appear in the public scene, to simulate video call experience in which two parties of the video call communicate face-to-face. Through this innovative interaction manner, intimacy between the two parties of the video call can be deepened.

In an embodiment, to further improve interestingness of the interaction manner, the method may further include: controlling, in a case that the target scene information is game scene information, the first object and the second object to perform a preset game action.

In an example, in a case that the target scene information is the game scene information, a game mode may be enabled in the video call interface, a game control may be displayed in the video call interface in the game mode, and the first user and the second user may control, by operating the game control, the first object and the second object to perform the preset game action, and display a corresponding game effect in the video call interface. For example, if the second user enables, by operating the game control, the second object to launch a hidden weapon to hit the first object, the first object may perform an action of falling to the ground, and a scar effect appears at a hit position.

In the foregoing embodiment, the electronic device may perform synchronous video recording in an interaction process between the first object and the second object in the game mode, and generate a short video for saving or sharing.

In this way, when receiving an input of selecting game scene information by a user, an electronic device can enable, in response to the input, a game mode of a video call interface, and can control, in the game mode, a first object and a second object to perform a preset game action, and effectively combine a video call with a game, thereby providing new video call experience for the user through the interesting interaction manner.

It should be noted that, the electronic device in this embodiment of this application may have a single screen, a double screen, a multi-screen, a foldable screen, a retractable screen, or the like, which is not limited herein.

In some embodiments of this application, in a case that the electronic device includes a first display screen and a second display screen, the displaying the first object in the video call interface according to a first preset display manner corresponding to the first input may include: displaying the first object in the first display screen according to the first preset display manner.

Figure 13:
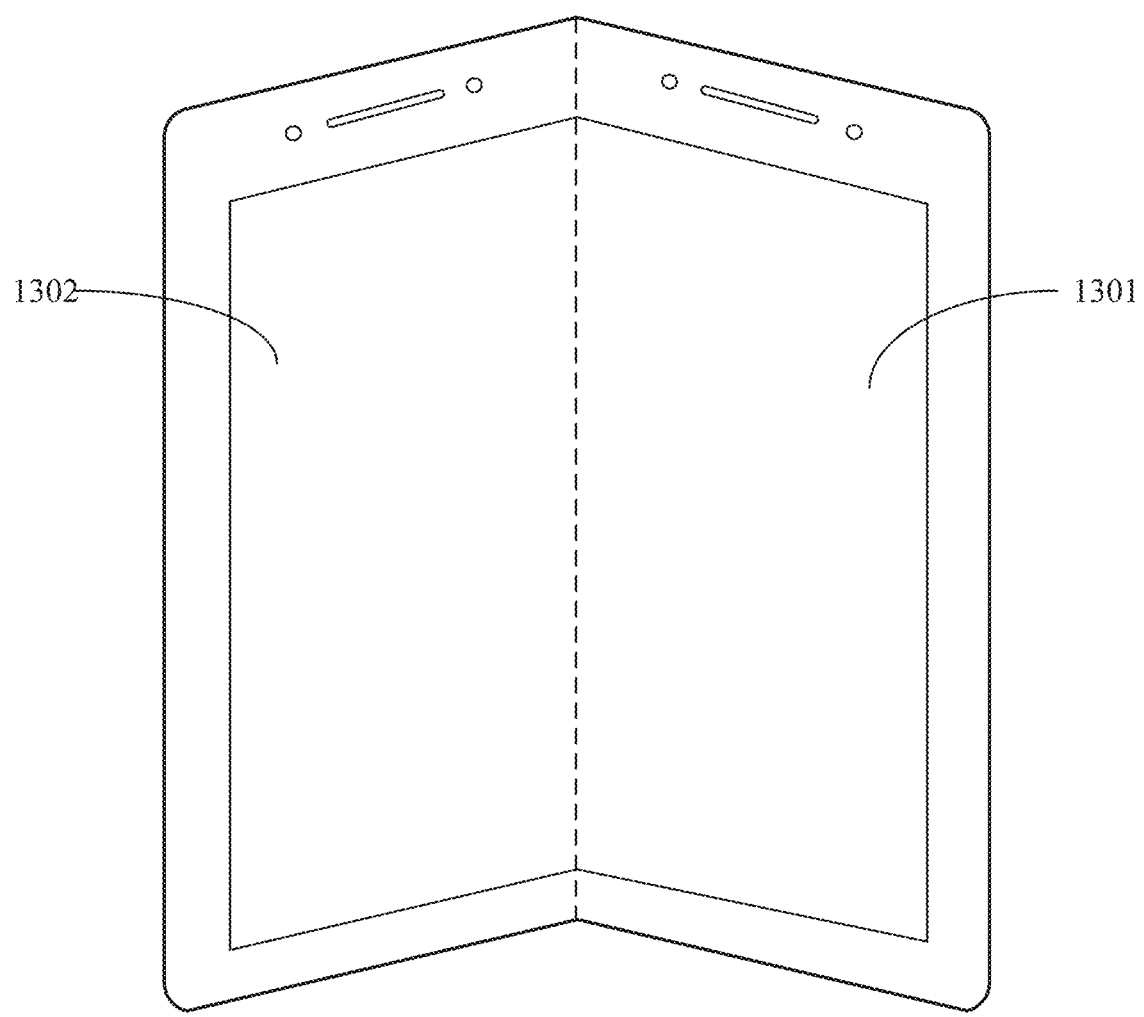
FIG. 13 is a schematic structural diagram of an electronic device according to an embodiment of this application.
Figure 14:
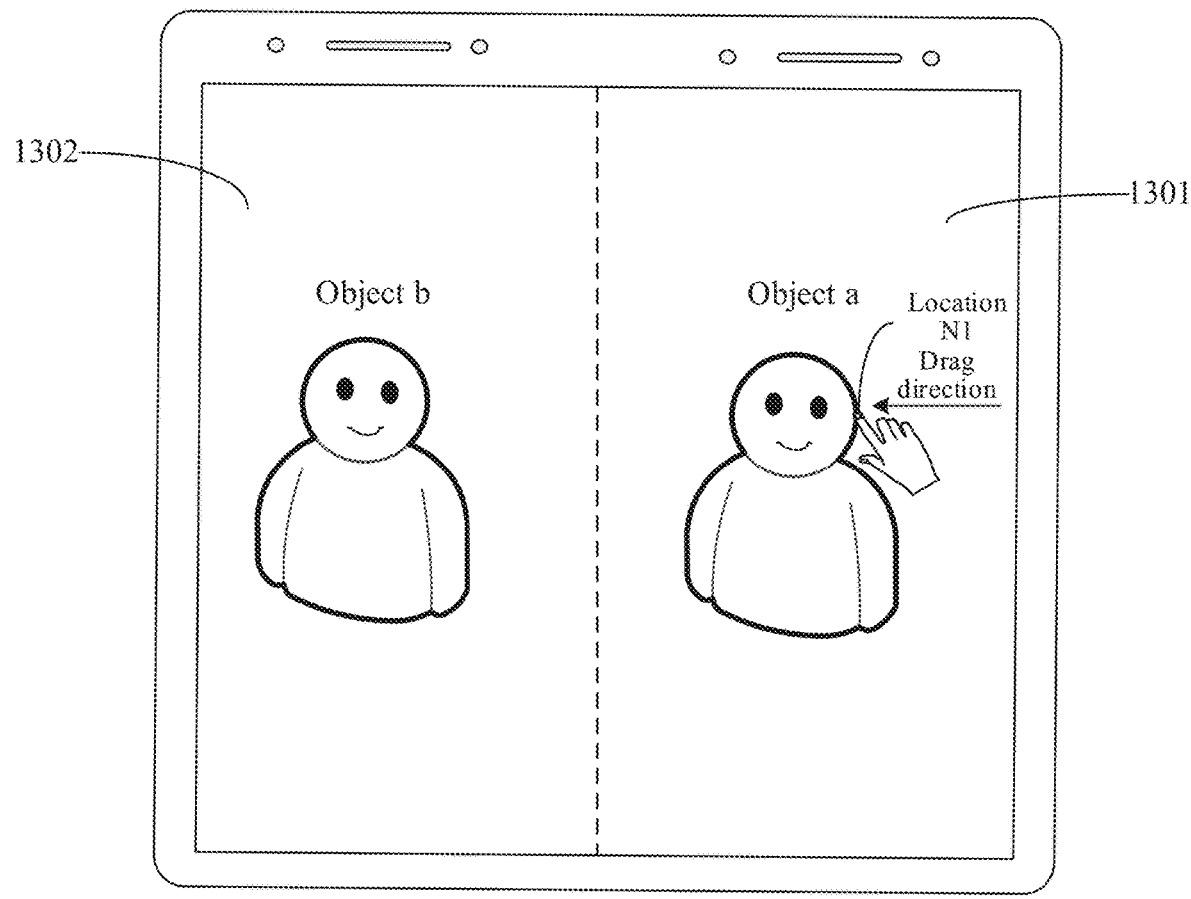
FIG. 14 is a tenth schematic diagram of an interaction interface for a video call according to an embodiment of this application.

In an example, as shown in FIG. 13, the electronic device includes a first display screen 1301 and a second display screen 1302. As shown in FIG. 14, the first object, namely, an object a, is displayed in 1301, and the second object corresponding to the second user, namely, an object b, is displayed in 1302. When receiving a pull input by the second user for a face location N1 of the object a, the electronic device may display, in response to the pull input, the object a whose face is correspondingly deformed in 1301.

In this way, in a case that an electronic device includes more than one screen, two parties of a video call can be displayed on two screens respectively, and a user can perform some touch screen operations on a screen on which a video call object is displayed to change a display manner of the video call object in a video call interface, thereby realizing an interesting interactive effect, and effectively improving video call experience of the user.

It should be noted that, an execution subject of the interaction method for a video call provided in this embodiment of this application may be an electronic device having at least one display screen, and may also be an interaction apparatus for a video call or a module configured to perform the interaction method for a video call in the interaction apparatus for a video call.

In this embodiment of this application, an example in which the interaction apparatus for a video call executes the interaction method for a video call is used to describe the interaction apparatus for a video call provided in the embodiments of this application.

Figure 15:
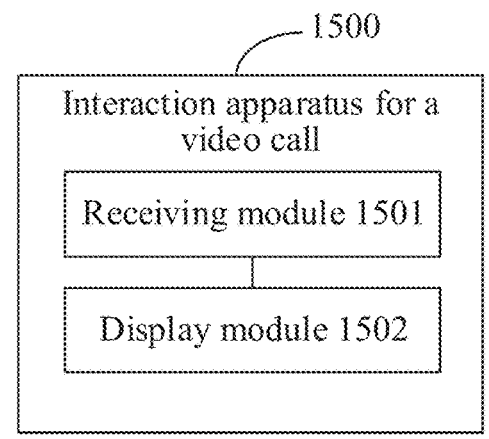
FIG. 15 is a structural schematic diagram of an interaction apparatus for a video call according to an embodiment of this application.

FIG. 15 is a schematic structural diagram of an interaction apparatus for a video call according to this application. The interaction apparatus for a video call may be applied to an electronic device having at least one display screen.

As shown in FIG. 15, an interaction apparatus 1500 for a video call provided in this application may include: a receiving module 1501 and a display module 1502.

The receiving module 1501 is configured to receive, in a case that a first user performs a video call with a second user, a first input by the second user for a first object corresponding to the first user in a video call interface. The display module 1502 is configured to display, in response to the first input, the first object in the video call interface according to a first preset display manner corresponding to the first input, where the first input includes a touch input for a target portion of the first object, and the first preset display manner includes that the target portion corresponding to the touch input is deformed.

In the interaction apparatus for a video call provided in this embodiment of this application, in a process in which a first user performs a video call with a second user, the second user may perform a first input for a first object that corresponds to the first user and that is displayed in a video call interface. When receiving the first input, an electronic device may display, in response to the first input, the first object according to a first preset display manner corresponding to the first input. For example, a user may perform a touch operation on a target portion of a video call object displayed in a video call interface. In response to the touch operation, the target portion of the video call object displayed in the interface may be correspondingly deformed. In this way, a diversified interaction manner can be provided for the user during a video call, and the user can change a display manner of the video call object in the video call interface through some operations implemented on the video call interface, thereby realizing an interesting interactive effect, and effectively improving video call experience of the user.

In some embodiments, the apparatus further includes: a determining module 1503, configured to determine a behavioral feature of the first input; and the display module 1502 is configured to: display, in a case that the behavioral feature of the first input is consistent with a preset behavioral feature, the first object in the video call interface according to the first preset display manner corresponding to the first input.

In this way, the behavioral feature of the first input is determined, and only a safe behavior corresponding to a behavioral feature consistent with the preset behavioral feature is displayed in the video call interface, thereby effectively filtering out a behavior corresponding to a behavioral feature inconsistent with the preset behavioral feature, for example, an indecent behavior. In this way, the safety of the interaction behavior during the video call can be ensured, thereby improving safety of the video call.

In some embodiments, the first input further includes a second input of moving the first object to a target region in the video call interface; and the display module 1502 is further configured to display the first object in the target region.

In some embodiments, in a case that the target region includes a second object corresponding to the second user, the display module 1502 is configured to display the first object and the second object in the target region.

In this way, a user can perform a moving operation on a video call object in a video call interface and move the video call object to any region in the video call interface, and can also move the video call object to a region in which the user is located, thereby shortening a distance between two parties of a video call, and bringing new video call experience for the user.

In some embodiments, a first control or a preset region is displayed in the video call interface; the receiving module 1501 is further configured to receive a third input for the first control or the preset region; the display module 1502 is further configured to display a second control in response to the third input; the receiving module 1501 is further configured to receive a fourth input of dragging the first object to a target region in the video call interface by the second user by using the second control; and the display module 1502 is further configured to display, in response to the fourth input, the first object in the target region.

In this way, an electronic device can move a video call object only when the electronic device receives an input by a user for a first control or a preset region, to avoid some misoperations caused by the user accidentally touching a video playback interface, for example, avoid the user accidentally moving a first object to a corner region of the video playback interface, thereby improving use experience of the user.

In some embodiments, a third control and a second object corresponding to the second user are displayed in the video call interface; the receiving module 1501 is further configured to receive a fifth input by the second user for the third control; the display module 1502 is further configured to display a plurality of pieces of scene information in response to the fifth input; the receiving module 1501 is further configured to receive a sixth input of selecting target scene information from the plurality of pieces of scene information by the second user; and the display module 1502 is further configured to display, in response to the sixth input, the second object in a scene corresponding to the target scene information.

In this way, after receiving an input of selecting target scene information from a plurality of pieces of scene information by a user, in response to the input, an electronic device can replace a video call background of the user with the target scene information, thereby providing a function of independently replacing the video call background for the user during a video call, and effectively improving user experience.

In some embodiments, the scene information includes at least one of a current video call background of a first user, a current video call background of the second user, or preset virtual scene information; and the display module 1502 is configured to display the first object and the second object in the scene corresponding to the target scene information.

In this way, a user can select a scene corresponding to target scene information as a public scene of two parties of a video call, and the two parties of the video call can simultaneously appear in the public scene, to simulate video call experience in which two parties of the video call communicate face-to-face. Through this innovative interaction manner, intimacy between the two parties of the video call can be deepened.

The interaction apparatus for a video call in this embodiment of this application may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like, and the non-mobile electronic device may be a server, a network attached memory (NAS), a personal computer (PC), a television (TV), a teller machine, a self-service machine, or the like. This is not specifically limited in this embodiment of this application.

The interaction apparatus for a video call in this embodiment of this application may be an apparatus having an operating system. The operating system may be an Android operating system, may be an iOS operating system, or may be another possible operating system, which is not specifically limited in this embodiment of this application.

The interaction apparatus for a video call provided in this embodiment of this application can implement all processes implemented by the method embodiments of FIG. 1, FIG. 7, and FIG. 10. To avoid repetition, details are not described herein again.

Figure 16:
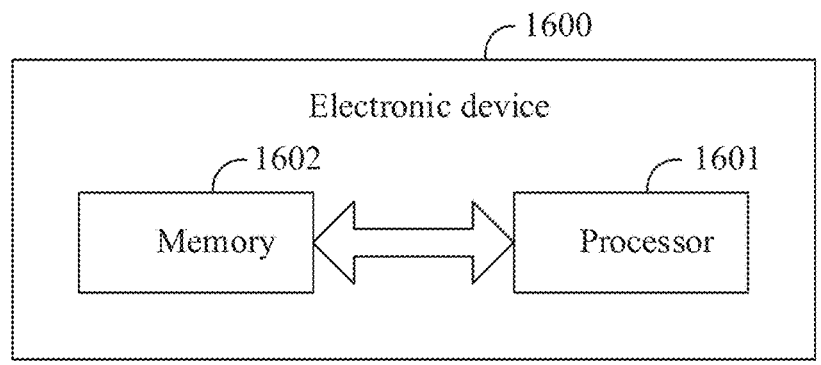
FIG. 16 is a schematic diagram of a hardware structure of an example of an electronic device according to an embodiment of this application.

In some embodiments, FIG. 16 is a schematic diagram of a hardware structure of an example of an electronic device according to an embodiment of this application. As shown in FIG. 16, an electronic device 1600 includes: a processor 1601, a memory 1602, and a program or instruction stored on the memory 1602 and executable on the processor 1601. The program or instruction, when executed by the processor 1601, implements all processes of the embodiments of the foregoing interaction method for a video call, and can achieve the same technical effects. To avoid repetition, details are not described herein again.

It should be noted that, the electronic device in this embodiment of this application includes the foregoing mobile electronic device and non-mobile electronic device.

Figure 17:
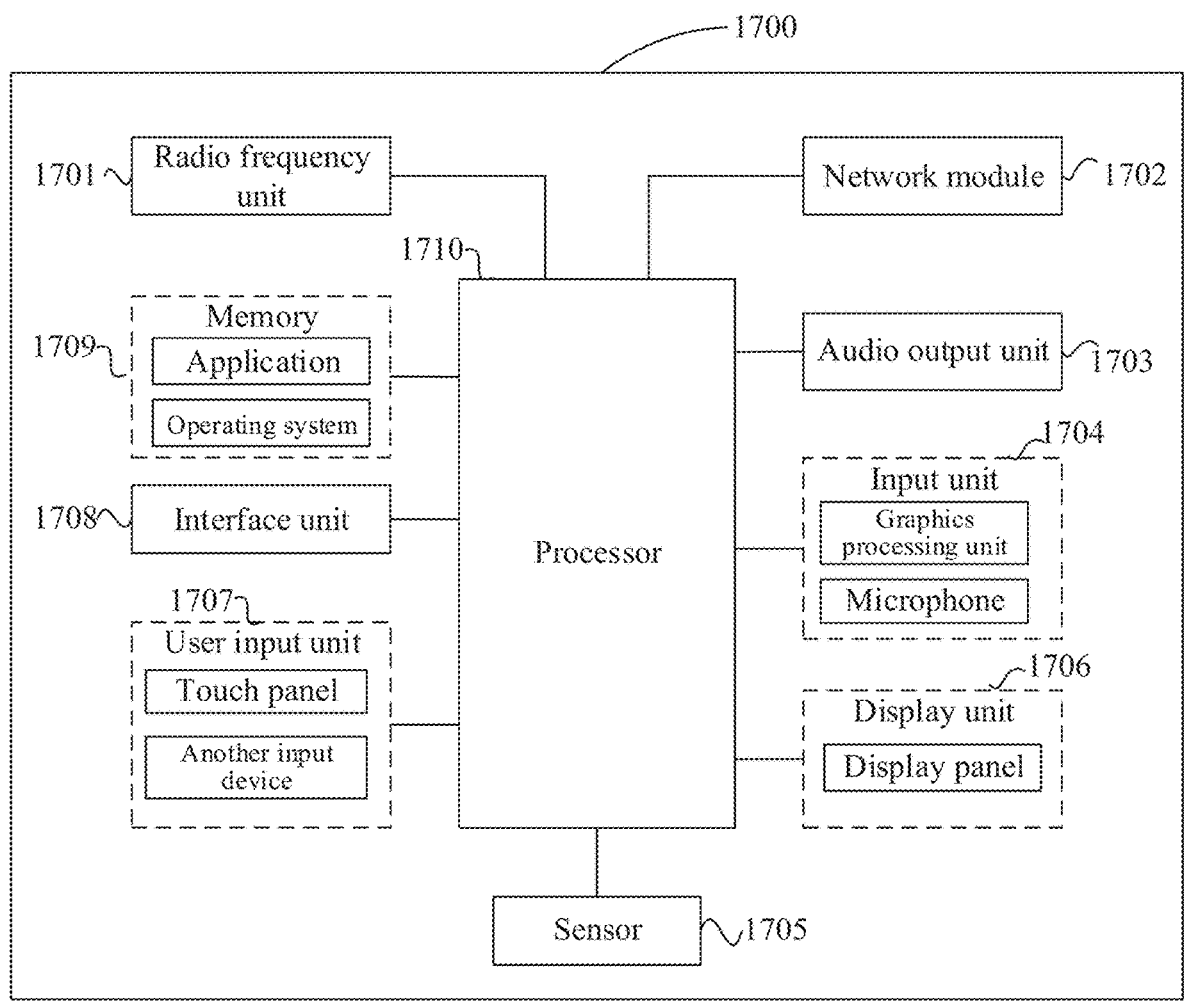
FIG. 17 is a schematic diagram of a hardware structure of another example of an electronic device according to an embodiment of this application.

In some embodiments, FIG. 17 is a schematic diagram of a hardware structure of another example of an electronic device according to an embodiment of this application.

As shown in FIG. 17, an electronic device 1700 includes, but is not limited to, components such as a radio frequency unit 1701, a network module 1702, an audio output unit 1703, an input unit 1704, a sensor 1705, a display unit 1706, a user input unit 1707, an interface unit 1708, a memory 1709, and a processor 1710.

A person skilled in the art may understand that the electronic device 1700 further includes a power supply (such as a battery) for supplying power to the components. The power supply may logically connect to the processor 1710 by using a power supply management system, thereby implementing functions, such as charging, discharging, and power consumption management, by using the power supply management system. The structure of the electronic device shown in FIG. 17 constitutes no limitation on the electronic device, and the electronic device may include more or fewer components than those shown in the figure, or some components may be combined, or a different component deployment may be used. Details are not described herein again.

The user input unit 1707 is configured to receive, in a case that a first user performs a video call with a second user, a first input by the second user for a first object corresponding to the first user in a video call interface. The display unit 1706 is configured to display, in response to the first input, the first object in the video call interface according to a first preset display manner corresponding to the first input, where the first input includes a touch input for a target portion of the first object, and the first preset display manner includes that the target portion corresponding to the touch input is deformed.

In this embodiment of this application, in a process in which a first user performs a video call with a second user, the second user may perform a first input for a first object that corresponds to the first user and that is displayed in a video call interface. When receiving the first input, an electronic device may display, in response to the first input, the first object according to a first preset display manner corresponding to the first input. For example, a user may perform a touch operation on a target portion of a video call object displayed in a video call interface. In response to the touch operation, the target portion of the video call object displayed in the interface may be correspondingly deformed. In this way, a diversified interaction manner can be provided for the user during a video call, and the user can change a display manner of the video call object in the video call interface through some operations implemented on the video call interface, thereby realizing an interesting interactive effect, and effectively improving video call experience of the user.

In some embodiments, the processor 1710 is configured to determine a behavioral feature of the first input; and the display unit 1706 is configured to: display, in a case that the behavioral feature of the first input is consistent with a preset behavioral feature, the first object in the video call interface according to the first preset display manner corresponding to the first input.

In this way, the behavioral feature of the first input is determined, and only a safe behavior corresponding to a behavioral feature consistent with the preset behavioral feature is displayed in the video call interface, thereby effectively filtering out a behavior corresponding to a behavioral feature inconsistent with the preset behavioral feature, for example, an indecent behavior. In this way, the safety of the interaction behavior during the video call can be ensured, thereby improving safety of the video call.

In some embodiments, the first input further includes a second input of moving the first object to a target region in the video call interface; and the display unit 1706 is further configured to display the first object in the target region.

In some embodiments, in a case that the target region includes a second object corresponding to the second user, the display unit 1706 is configured to display the first object and the second object in the target region.

In this way, a user can perform a moving operation on a video call object in a video call interface and move the video call object to any region in the video call interface, and can also move the video call object to a region in which the user is located, thereby shortening a distance between two parties of a video call, and bringing new video call experience for the user.

In some embodiments, a first control or a preset region is displayed in the video call interface; the user input unit 1707 is further configured to receive a third input for the first control or the preset region; the display unit 1706 is further configured to display a second control in response to the third input; the user input unit 1707 is further configured to receive a fourth input of dragging the first object to a target region in the video call interface by the second user by using the second control; and the display unit 1706 is further configured to display, in response to the fourth input, the first object in the target region.

In this way, an electronic device can move a video call object only when the electronic device receives an input by a user for a first control or a preset region, to avoid some misoperations caused by the user accidentally touching a video playback interface, for example, avoid the user accidentally moving a first object to a corner region of the video playback interface, thereby improving use experience of the user.

In some embodiments, a third control and a second object corresponding to the second user are displayed in the video call interface; the user input unit 1707 is further configured to receive a fifth input by the second user for the third control; the display unit 1706 is further configured to display a plurality of pieces of scene information in response to the fifth input; the user input unit 1707 is further configured to receive a sixth input of selecting target scene information from the plurality of pieces of scene information by the second user; and the display unit 1706 is further configured to display, in response to the sixth input, the second object in a scene corresponding to the target scene information.

In this way, after receiving an input of selecting target scene information from a plurality of pieces of scene information by a user, in response to the input, an electronic device can replace a video call background of the user with the target scene information, thereby providing a function of independently replacing the video call background for the user during a video call, and effectively improving user experience.

In some embodiments, the scene information includes at least one of a current video call background of a first user, a current video call background of the second user, or preset virtual scene information; and the display unit 1706 is configured to display the first object and the second object in the scene corresponding to the target scene information.

In this way, a user can select a scene corresponding to target scene information as a public scene of two parties of a video call, and the two parties of the video call can simultaneously appear in the public scene, to simulate video call experience in which two parties of the video call communicate face-to-face. Through this innovative interaction manner, intimacy between the two parties of the video call can be deepened.

An embodiment of this application further provides a readable storage medium, storing a program or instruction. The program or instruction, when executed by a processor, implements all processes of the embodiments of the foregoing interaction method for a video call, and can achieve the same technical effects. To avoid repetition, details are not described herein again.

The processor is the processor in the foregoing electronic device in the foregoing embodiments. The readable storage medium includes a computer-readable storage medium, and an example of the computer-readable storage medium includes a non-transient computer-readable storage medium, for example, a computer Read-Only Memory (ROM), a Random Access Memory (RAM), a magnetic disk, or an optical disc.

An embodiment of this application further provides a chip, including a processor and a communication interface, where the communication interface is coupled to the processor, and the processor is configured to run a program or instruction, to implement all processes of the embodiments of the foregoing interaction method for a video call, and can achieve the same technical effects. To avoid repetition, details are not described herein again.

It should be understood that, the chip mentioned in this embodiment of this application may also be referred to as a system-level chip, a system chip, a chip system, a system on chip, or the like.

It should be noted that, the term "include", "comprise" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one . . . " does not exclude that there are still other same elements in the processes, methods, objects, or apparatuses. In addition, it should be noted that the scope of the methods and apparatuses in the implementations of this application is not limited to performing the functions in the order shown or discussed, but may also include performing, according to involved functions, the functions basically simultaneously or in a reverse order. For example, the described methods may be performed in an order different from that described, and various steps may also be added, omitted, or combined. In addition, features described with reference to some examples may be combined in other examples.

Aspects of this application are described above with reference to flowchart illustrations and/or block diagrams of methods, apparatuses (systems) and computer program products according to embodiments of this application. It should be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus, to generate a machine, such that these instructions, which are executed via the processor of the computer or other programmable data processing apparatus, enable the implementation of implementing the functions/acts specified in one or more blocks of the flowcharts and/or block diagrams. Such a processor may be, but not limited to, a general-purpose processor, a special-purpose processor, an application-specific processor or a field-programmable logic circuit. It should be further noted that, each box in a block diagram and/or a flowchart and a combination of boxes in the block diagram and/or the flowchart may be implemented by using a dedicated hardware configured to perform a specified function or action, or may be implemented by using a combination of dedicated hardware and a computer instruction.

Through the descriptions of the foregoing implementations, a person skilled in the art may clearly understand that the method according to the foregoing embodiments may be implemented by means of software and a necessary general hardware platform, and may be implemented by hardware, but in many cases, the former manner is a better implementation. Based on such an understanding, the technical solutions in this application essentially or the part contributing to the existing technologies may be implemented in the form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings. However, this application is not limited to the foregoing specific implementations. The foregoing specific implementations are illustrative instead of limitative. Enlightened by this application, a person of ordinary skill in the art can make many forms without departing from the idea of this application and the scope of protection of the claims. All of the forms fall within the protection of this application.

What is claimed is:

1. An interaction method for a video call, performed by an electronic device having at least one display screen, comprising:
receiving, during a video call between a first user and a second user, a first input from the second user on an interaction control displayed in a video call interface for a first object corresponding to the first user, wherein the interaction control and the first object are displayed non-overlappingly with each other, wherein the interaction control comprises at least one of an emotion control or an action control, and the interaction control corresponds to a first preset display manner;
displaying, in response to the first input, a preset interactive animation, for interacting with the first object in the video call interface according to the first preset display manner corresponding to the first input, wherein the first input comprises a touch input for a target portion of the first object, and the first preset display manner comprises deformation of the target portion corresponding to the touch input;
when the video call interface displays a third control and a second object corresponding to the second user, the interaction method further comprises:
receiving a fifth input by the second user on the third control;
displaying a plurality of scenes in response to the fifth input, wherein the plurality of scenes comprise:
a current video call background of the first user representing a real environment where the first user is located; and
a current video call background of the second user representing a real environment where the second user is located;
receiving a sixth input from the second user for selecting a scene from the plurality of scenes; and displaying, in response to the sixth input, the first object and the second object together in the scene selected by the sixth input.

2. The interaction method according to claim 1, wherein displaying, in response to the first input, a preset interactive animation, for interacting with the first object in the video call interface according to the first preset display manner corresponding to the first input comprises:
   determining a behavioral feature of the first input; and
   displaying, when the behavioral feature of the first input is consistent with a preset behavioral feature, the first object in the video call interface according to the first preset display manner corresponding to the first input.

3. The interaction method according to claim 1, wherein the first input further comprises a second input of moving the first object to a target region in the video call interface, and displaying the first object in the video call interface according to the first preset display manner comprises:
   displaying the first object in the target region.

4. The interaction method according to claim 3, wherein when the target region comprises a second object corresponding to the second user, displaying the first object in the target region comprises:
   displaying the first object and the second object in the target region.

5. The interaction method according to claim 1, wherein when the video call interface displays a first control or a preset region, the method further comprises:
   receiving a third input for the first control or the preset region;
   displaying a second control in response to the third input;
   receiving a fourth input of dragging the first object to a target region in the video call interface by the second user by using the second control; and
   displaying, in response to the fourth input, the first object in the target region.

6. An electronic device having at least one display screen, comprising:
   a memory storing a computer program; and
   a processor coupled to the memory and configured to execute the computer program to perform operations comprising:
      receiving, during a video call between a first user and a second user, a first input from the second user on an interaction control displayed on a video call interface for a first object corresponding to the first user, wherein the interaction control and the first object are displayed non-overlappingly with each other, wherein the interaction control comprises at least one of an emotion control or an action control, and the interaction control corresponds to a first preset display manner;
      displaying, in response to the first input, a preset interactive animation, for interacting with the first object in the video call interface according to the first preset display manner corresponding to the first input, wherein the first input comprises a touch input for a target portion of the first object, and the first preset display manner comprises deformation of the target portion corresponding to the touch input;
      when the video call interface displays a third control and a second object corresponding to the second user, the interaction method further comprises:
      receiving a fifth input by the second user on the third control;
      displaying a plurality of scenes in response to the fifth input, wherein the plurality of scenes comprise:
         a current video call background of the first user representing a real environment where the first user is located; and
         a current video call background of the second user representing a real environment where the second user is located;
      receiving a sixth input from the second user for selecting a scene from the plurality of scenes; and
      displaying, in response to the sixth input, the first object and the second object together in the scene selected by the sixth input.

7. The electronic device according to claim 6, wherein displaying, in response to the first input, a preset interactive animation, for interacting with the first object in the video call interface according to the first preset display manner corresponding to the first input comprises:
   determining a behavioral feature of the first input; and
   displaying, when the behavioral feature of the first input is consistent with a preset behavioral feature, the first object in the video call interface according to the first preset display manner corresponding to the first input.

8. The electronic device according to claim 6, wherein the first input further comprises a second input of moving the first object to a target region in the video call interface, and displaying the first object in the video call interface according to the first preset display manner comprises:
   displaying the first object in the target region.

9. The electronic device according to claim 8, wherein when the target region comprises a second object corresponding to the second user, displaying the first object in the target region comprises:
   displaying the first object and the second object in the target region.

10. The electronic device according to claim 6, wherein when the video call interface displays a first control or a preset region, the operations further comprise:
    receiving a third input for the first control or the preset region;
    displaying a second control in response to the third input;
    receiving a fourth input of dragging the first object to a target region in the video call interface by the second user by using the second control; and
    displaying, in response to the fourth input, the first object in the target region.

11. A non-transitory computer-readable storage medium, storing a computer program, wherein the computer program, when executed by a processor of an electronic device having at least one display screen, causes the processor to perform operations comprising:
    receiving, during a video call between a first user and a second user, a first input from the second user on an interaction control displayed in a video call interface for a first object corresponding to the first user, wherein the interaction control and the first object are displayed non-overlappingly with each other, wherein the interaction control comprises at least one of an emotion control or an action control, and the interaction control corresponds to a first preset display manner;
    displaying, in response to the first input, a preset interactive animation, for interacting with the first object in the video call interface according to the first preset display manner corresponding to the first input, wherein the first input comprises a touch input for a target portion of the first object, and the first preset display manner comprises deformation of the target portion corresponding to the touch input;

when the video call interface displays a third control and a second object corresponding to the second user, the interaction method further comprises:
  receiving a fifth input by the second user on the third control;
  displaying a plurality of scenes in response to the fifth input, wherein the plurality of scenes comprise:
    a current video call background of the first user representing a real environment where the first user is located; and
    a current video call background of the second user representing a real environment where the second user is located;
  receiving a sixth input from the second user for selecting a scene from the plurality of scenes; and
  displaying, in response to the sixth input, the first object and the second object together in the scene selected by the sixth input.

12. The non-transitory computer-readable storage medium according to claim 11, wherein displaying, in response to the first input, a preset interactive animation, for interacting with the first object in the video call interface according to the first preset display manner corresponding to the first input comprises:
  determining a behavioral feature of the first input; and
  displaying, when the behavioral feature of the first input is consistent with a preset behavioral feature, the first object in the video call interface according to the first preset display manner corresponding to the first input.

13. The non-transitory computer-readable storage medium according to claim 11, wherein the first input further comprises a second input of moving the first object to a target region in the video call interface, and displaying the first object in the video call interface according to the first preset display manner comprises:
  displaying the first object in the target region.

14. The non-transitory computer-readable storage medium according to claim 13, wherein when the target region comprises a second object corresponding to the second user, displaying the first object in the target region comprises:
  displaying the first object and the second object in the target region.

15. The non-transitory computer-readable storage medium according to claim 11, wherein when the video call interface displays a first control or a preset region, the operations further comprise:
  receiving a third input for the first control or the preset region;
  displaying a second control in response to the third input;
  receiving a fourth input of dragging the first object to a target region in the video call interface by the second user by using the second control; and
  displaying, in response to the fourth input, the first object in the target region.

* * * * *